(12) United States Patent
Lee

(10) Patent No.: US 12,527,482 B2
(45) Date of Patent: Jan. 20, 2026

(54) BLOOD PRESSURE MEASUREMENT SYSTEM AND BLOOD PRESSURE MEASUREMENT METHOD USING THE SAME

(71) Applicant: CHARMCARE CO., LTD., Seoul (KR)

(72) Inventor: Dong Hwa Lee, Yongin-si (KR)

(73) Assignee: CHARMCARE CO., LTD., Seoul (KR)

( * ) Notice: Subject to any disclaimer, the term of this patent is extended or adjusted under 35 U.S.C. 154(b) by 1030 days.

(21) Appl. No.: 17/610,141

(22) PCT Filed: May 6, 2020

(86) PCT No.: PCT/KR2020/005962
§ 371 (c)(1),
(2) Date: Nov. 9, 2021

(87) PCT Pub. No.: WO2020/231064
PCT Pub. Date: Nov. 19, 2020

(65) Prior Publication Data
US 2022/0218217 A1    Jul. 14, 2022

(30) Foreign Application Priority Data
May 10, 2019  (KR) .................. 10-2019-0054769

(51) Int. Cl.
*A61B 5/022* (2006.01)
*A61B 5/026* (2006.01)

(52) U.S. Cl.
CPC ...... *A61B 5/02225* (2013.01); *A61B 5/02208* (2013.01); *A61B 5/026* (2013.01)

(58) Field of Classification Search
None
See application file for complete search history.

(56) References Cited

U.S. PATENT DOCUMENTS

2007/0225606 A1* 9/2007 Naghavi ............ A61B 5/022
                                                    600/438
2010/0106029 A1  4/2010 Fraden
(Continued)

FOREIGN PATENT DOCUMENTS

| KR | 10-2018-0040400 A | 4/2018 |
| KR | 10-2019-0011591 A | 2/2019 |
| KR | 10-2019-0048878 A | 5/2019 |

OTHER PUBLICATIONS

International Search Report in International Application No. PCT/KR2020/005962, dated Sep. 9, 2020, 2pages.

*Primary Examiner* — Aurelie H Tu
(74) *Attorney, Agent, or Firm* — Park, Kim & Suh, LLC

(57) ABSTRACT

Disclosed are a blood pressure measurement system for calculating a blood pressure value by using biometric signals measured at two different regions and a blood pressure measurement method using the same. The blood pressure measurement system includes a first sensor unit for detecting a hemorheological parameter at one region of a body; a second sensor unit for detecting a hemorheological parameter and arterial pressure at another region of the body; and a control unit including a blood pressure calculation unit for calculating a blood pressure value of a region at which a first hemorheological parameter is detected, from the first hemorheological parameter detected by the first sensor unit and a second hemorheological parameter and the arterial pressure detected by the second sensor unit. The present invention relates to a blood pressure measurement system for measuring blood pressure by using a change in vascular resistivity and a blood pressure parameter, and more specifically, to a sphygmomanometer for calculating blood pressure by using vascular resistivity obtained by a hemorheological parameter detected at one region of a body and arterial pressure and a hemorheological parameter (Continued)

detected at another region of the body. Accordingly, it is possible to more accurately measure blood pressure of a desired blood pressure acquisition region on the basis of a hemorheological parameter variance and vascular resistivity and greatly enhance reliability of a sphygmomanometer.

15 Claims, 10 Drawing Sheets

(56) References Cited

U.S. PATENT DOCUMENTS

2016/0345930 A1   12/2016  Mizukami et al.
2017/0238817 A1*  8/2017  Lading ................. A61B 5/6824
2018/0353089 A1*  12/2018  Choi ..................... A61B 5/742

* cited by examiner (a)

(b)

(a)

(b)

BLOOD PRESSURE MEASUREMENT SYSTEM AND BLOOD PRESSURE MEASUREMENT METHOD USING THE SAME

CROSS-REFERENCE TO RELATED APPLICATIONS

This application is a National Phase Application of PCT International Application No. PCT/KR2020/005962, which was filed on May 6, 2020, and which claims priority from Korean Patent Application No. 10-2019-0054769 filed on May 10, 2019. The disclosures of the above patent applications are incorporated herein by reference in their entirety.

TECHNICAL FIELD

The present invention relates to a blood pressure measurement system and a measurement calculation method using the same, and more particularly, to a blood pressure measurement system (sphygmomanometer) and a blood pressure measurement method using the same for calculating blood pressure by using a hemorheological parameter and vascular resistivity.

BACKGROUND ART

Generally, blood pressure is to measure pressure at which the blood is affected on the wall of the blood vessel, and the heart repeats the contraction and relaxation about 60 to 80 times in one minute. The pressure on the blood vessel when the heart is contracting to pump blood is called 'systolic blood pressure', and 'maximal blood pressure' due to the highest pressure. In addition, the pressure on the blood vessel when the heart is relaxing to receive the blood is called 'diastolic blood pressure', and 'minimal blood pressure' due to the lowest pressure.

Usually, the blood pressure of the normal has the systolic blood pressure of 120 mmHg and the diastolic blood pressure of 80 mmHg. In Korea, one or more of four adults correspond to hypertension, and after 40 years of age, this ratio thereof is rapidly increasing, but there are patients classified as hypotension.

The hypertension becomes a problem when the hypertension is not appropriately managed but left, and may cause other complications capable of threatening the life, such as ocular disease, kidney disease, arterial disease, brain diseases, and heart disease. Accordingly, continuous measurement and management of the blood pressure should be done in patients with risk of complications or complications.

As interests in diseases related to adult diseases such as hypertension and health are increasing, various types of blood pressure measuring devices have been developed. The blood pressure measuring method includes a Korotkoff sounds method, an oscillometric method, a tonometric method, and the like.

The Korotkoff sounds method is a typical pressure measuring method, and a method of measuring pressure when the pulse first sounds as systolic pressure and measuring pressure when the pulse disappears as diastolic pressure in a process of blocking the blood flow and then reducing the pressure by applying sufficient pressure to a body region through which the arterial blood passes.

In addition, the oscillometric method and the tonometric method are methods applied to a digitalized blood pressure measuring device. The oscillometric method is to measure the systolic pressure and the diastolic pressure by detecting pulse waves generated in a process of pressurizing sufficiently the body region through which the arterial blood passes so that the blood flow of the artery is blocked and then reducing the pressure at a constant rate or a process of pressurizing the body region to increase the pressure at a constant rate.

Here, the pressure at a constant level as compared with the moment when the amplitude of the pulse wave is maximal may also be measured as systolic pressure or diastolic pressure, and the pressure when a change rate of the amplitude of the pulse wave is rapidly changed may also be measured as systolic pressure or diastolic pressure.

In the process of reducing the pressure at a predetermined rate after pressurization, the systolic pressure is measured earlier than the maximum amplitude of the pulse wave, and the diastolic pressure is measured later than the maximum amplitude of the pulse wave. On the contrary, in the process of reducing the pressure at a predetermined rate after pressurization, the systolic pressure is measured earlier than the maximum amplitude of the pulse wave, and the diastolic pressure is measured later than the maximum amplitude of the pulse wave.

The tonometric method is a method of applying constant pressure having a size which does not completely block the blood flow of the artery and continuously measuring the blood pressure by using the magnitudes and shapes of the pulse waves generated at this time.

As described above, a device for measuring the blood pressure by various methods, that is, a sphygmomanometer is the most basic medical device for measuring the blood pressure as the basis of the health index and is not only almost essentially provided in general clinics and hospitals, but also frequently used for measuring the personal blood pressure even in sports centers and the like. Recently, a portable sphygmomanometer has also been developed.

In order to enhance the accuracy of the aforementioned blood pressure measurement, the blood pressure measurement needs to be performed at a body region at the heart height, and when the blood pressure measurement is performed in a region where the blood pressure is easily detected, for example, in the wrist, a blood pressure difference depending on a height difference should be reflected to the blood pressure calculation.

DISCLOSURE

Technical Problem

An object of the present invention is to provide a blood pressure measurement system and a measurement calculation method using the same capable of calculating vascular resistivity by detecting biometric signals at two different regions of the body and calculating a blood pressure value by using the vascular resistivity and a hemorheological parameter.

Technical Solution

An aspect of the present invention provides a blood pressure measurement system as a blood pressure measurement system for calculating a blood pressure value by using biometric signals measured at two different regions, including: a first sensor unit for detecting a hemorheological parameter at one region of a body; a second sensor unit for detecting a hemorheological parameter and arterial pressure at another region of the body; and a control unit including a blood pressure calculation unit for calculating a blood pressure value of a region at which a first hemorheological parameter is detected, from the first hemorheological parameter detected by the first sensor unit and a second hemorheological parameter and the arterial pressure detected by the second sensor unit.

The blood pressure calculation unit may acquire a second hemorheological parameter variance and an arterial pressure variance between two times from the second hemorheological parameter and the arterial pressure measured at the two times by the second sensor unit to calculate vascular resistivity from the second hemorheological parameter variance and the arterial pressure variance and calculate the blood pressure value by using the vascular resistivity and the first hemorheological parameter.

The blood pressure calculation unit may acquire a difference between a maximum blood pressure value and a minimum blood pressure value at the region where the arterial pressure is measured by the second sensor unit as the arterial pressure variance. Of course, at two times with the time difference, the first sensor unit measures the first hemorheological parameter and the second sensor unit measures the second hemorheological parameter and the arterial pressure, and then between the two times, a variance (difference in first hemorheological parameter) of the first hemorheological parameter, a variance (difference in second hemorheological parameter) of the second hemorheological parameter, and an arterial pressure variance (difference in arterial pressure) may also be obtained.

The maximum blood pressure value and the minimum blood pressure value measured by the second sensor unit may be acquired by any one of oscillometric blood pressure measurement, tonometric blood pressure measurement, and Korotkoff blood pressure measurement.

The vascular resistivity may be calculated by the following Equation 1; and the blood pressure value may be acquired by the following Equation 2.

$$R = \Delta P / \Delta PM_2 \qquad \text{[Equation 1]}$$

(R represents vascular resistivity, $\Delta P$ represents an arterial pressure variance, and $\Delta PM_2$ represents a second hemorheological parameter variance)

$$BP = PM_1 \times R \times K \qquad \text{[Equation 2]}$$

(BP represents a blood pressure value of a region (first body region) where the first hemorheological parameter is detected by the first sensor unit, $PM_1$ represents a first hemorheological parameter value, R represents vascular resistivity, and K represents an adjustment constant)

The control unit may further include a setting unit for setting the adjustment constant.

The setting unit may set the adjustment constant by using the first hemorheological parameter and the second hemorheological parameter detected while the first sensor unit and the second sensor unit are located at the same height.

The first hemorheological parameter and the second hemorheological parameter detected by the first sensor unit and the second sensor unit may have blood flow information.

More specifically, the first hemorheological parameter and the second hemorheological parameter detected by the first sensor unit and the second sensor unit may be one of a photoarterial wave, an arterial pressure wave, an arterial impedance wave, a blood flow rate, a pulse transit time (PTT), a pulse wave analysis (PWA), and a waveform parameter having the blood flow information.

The first sensor unit and the second sensor unit may include at least one sensor selected from the group consisting of a pressure sensor, an optical sensor, an ultrasonic sensor, and a radar sensor.

The second sensor unit may include a blood flow measurement sensor for detecting the second hemorheological parameter and an arterial pressure measurement sensor for detecting the arterial pressure.

The second sensor unit may be provided, for example, wearable on one region of a finger, a wrist radial artery, a philtrum, and an earlobe, and the first sensor unit may be worn on a region of the heart height, for example, an upper arm.

The first sensor unit and the second sensor unit may be connected to the control unit wiredly or wirelessly, and the biometric signals measured in the first sensor unit and the second sensor unit, i.e., the first hemorheological parameter, the second hemorheological parameter, and the arterial pressure may be transmitted to the control unit wiredly or wirelessly. For example, the first sensor unit and the second sensor unit may transmit the biometric signals to the control unit based on the Internet of Things.

Another aspect of the present invention provides a blood pressure measurement method as a blood pressure measurement method for calculating a blood pressure value by using biometric signals measured at two different regions, including: calculating a blood pressure value of a region where a first hemorheological parameter is detected, from the first hemorheological parameter detected at one region of a body and a second hemorheological parameter and arterial pressure detected at another region of the body. More specifically, a processor for calculating the blood pressure may calculate a blood pressure value of the region where the first hemorheological parameter is detected, that is, the first body region, from the first hemorheological parameter, the second hemorheological parameter, and the arterial pressure.

The blood pressure measurement method may include a step (a) of acquiring a second hemorheological parameter variance and an arterial pressure variance between two times from the second hemorheological parameter and the arterial pressure detected at the two different times by the second sensor unit; a step (b) of calculating vascular resistivity from the second hemorheological parameter variance and the arterial pressure variance; and a step (c) of calculating the blood pressure value by using the vascular resistivity and the first hemorheological parameter.

In step (a), a difference between a maximum blood pressure value and a minimum blood pressure value at the region where the arterial pressure is measured may be acquired as the arterial pressure variance.

The maximum blood pressure value and the minimum blood pressure value may be acquired by any one of oscillometric blood pressure measurement, tonometric blood pressure measurement, and Korotkoff blood pressure measurement.

Step (b) may include calculating the vascular resistivity by using the following Equation 1; and step (c) may include acquiring the blood pressure value by using the following Equation 2.

$$R = \Delta P / \Delta PM_2 \qquad \text{[Equation 1]}$$

(R represents vascular resistivity, ΔP represents an arterial pressure variance, and $\Delta PM_2$ represents a second hemorheological parameter variance)

$$BP = PM_1 \times R \times K \qquad \text{[Equation 2]}$$

(BP represents a blood pressure value of a region where the first hemorheological parameter is measured by the first sensor unit, $PM_1$ represents a first hemorheological parameter value, R represents vascular resistivity, and K represents an adjustment constant)

The blood pressure measurement method may further include a setting step of setting the adjustment constant, before step (c). For example, when the arterial pressure is measured by the oscillometric blood pressure measurement method, it is unnecessary to set the adjustment constant, and when the arterial pressure is measured by the tonometric blood pressure measurement method, it is necessary to set the adjustment constant.

In addition, the blood pressure measurement method may further include a step of measuring the first hemorheological parameter having blood flow information on one region of the body and measuring the second hemorheological parameter having blood flow information on another region of the body, before step (a).

Advantageous Effects

The present invention relates to a blood pressure measurement system for measuring blood pressure by using a change in vascular resistivity and a blood pressure parameter, and more specifically, to a sphygmomanometer for calculating blood pressure by using vascular resistivity obtained by a hemorheological parameter detected at one region of a body and arterial pressure and a hemorheological parameter detected at another region of the body, and a blood pressure measurement method using the same. Accordingly, it is possible to more accurately measure blood pressure of a desired blood pressure acquisition region on the basis of a variance in hemorheological parameter and vascular resistivity and greatly enhance reliability of a sphygmomanometer.

DESCRIPTION OF DRAWINGS

The above and other aspects, features and other advantages of the present invention will be more clearly understood from the following detailed description taken in conjunction with the accompanying drawings, in which.

MODES FOR THE INVENTION

Figure 1:
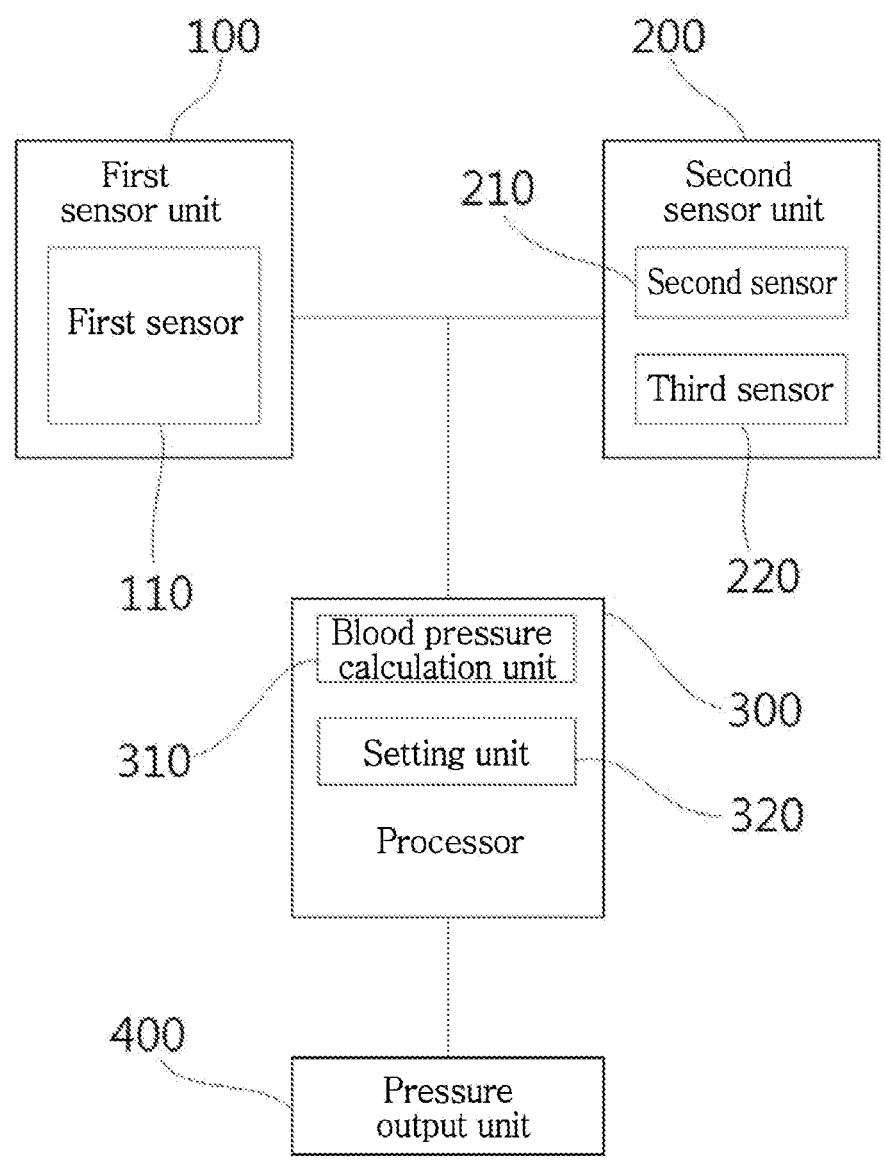
FIG. 1 is a block diagram illustrating a configuration of a blood pressure measurement system according to an embodiment of the present invention.

Hereinafter, a preferred embodiment of the present invention, of which an object of the present invention may be realized in detail, will be described with reference to the accompanying drawings. In describing the embodiment, the same name and the same reference numeral are used with respect to the same component and the resulting additional description will be omitted.

Terms used in the present application are used only to describe specific embodiments, and are not intended to limit the present invention. For example, the terms including ordinal numbers such as "first", "second", and the like may be used to distinguish components having the same name from each other, but the number of components is not defined or limited thereto.

It should be understood that, when it is described that a component is "coupled" or "connected" to the other component, the component may be directly coupled or connected to the other component, but there may be anther component therebetween.

In the present application, it should be understood that term "including" or "having" indicates that a feature, a number, a step, an operation, a component, a part or the combination thereof described in the specification is present, but does not exclude a possibility of presence or addition of one or more other features, numbers, steps, operations, components, parts or combinations, in advance.

A blood pressure measurement system according to an embodiment of the present invention is a device that detects a hemorheological parameter and arterial pressure and calculates blood pressure by using the same, and may be implemented as a portable sphygmomanometer, more specifically, a wearable measuring device of blood pressure. The embodiment of the present invention may be provided as a portable sphygmomanometer that detects a hemorheological parameter of a desired region (target region) for obtaining a blood pressure value and detects a hemorheological parameter and arterial pressure separately at another region other than the target region to obtain a blood pressure value of the target region.

Hereinafter, embodiments of a sphygmomanometer according to the present invention will be described with reference to the accompanying drawings.

Figure 2:
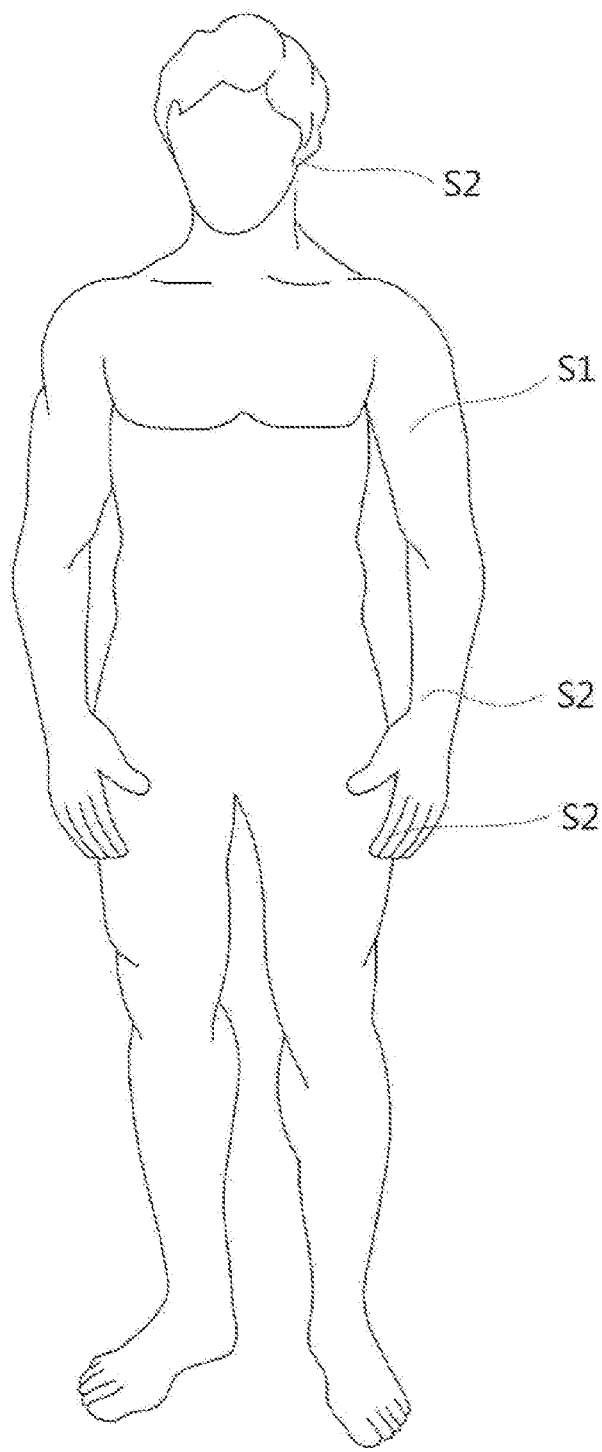
FIG. 2 is a diagram schematically illustrating a physical application example of the blood pressure measurement system according to an embodiment of the present invention.
Figure 3:
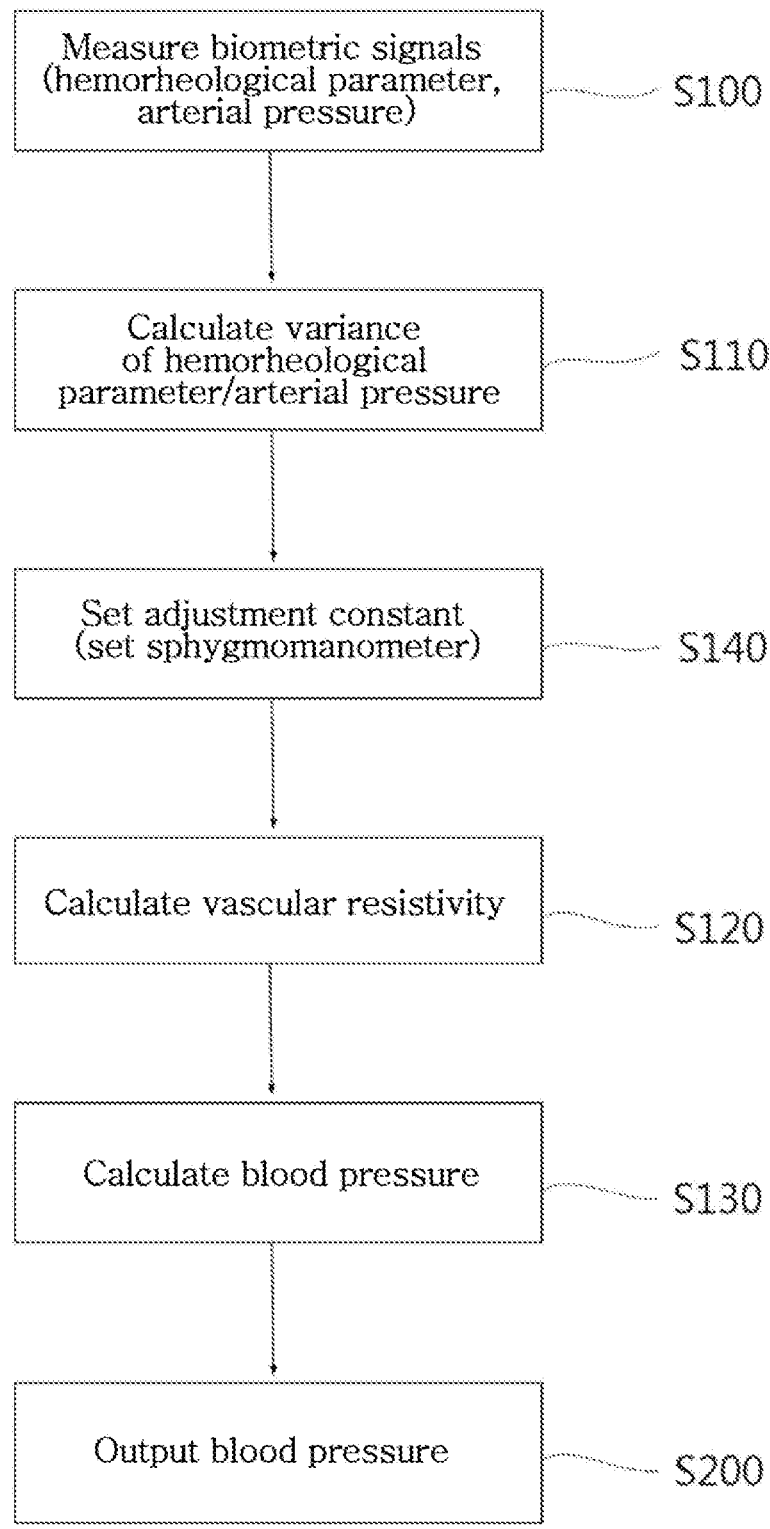
FIG. 3 is a flowchart schematically illustrating a blood pressure measurement method according to an embodiment of the present invention.

First, referring to FIGS. 1 to 3, an embodiment of the sphygmomanometer according to the present invention includes a first sensor unit 100 for detecting a hemorheological parameter PM at one region of a body, a second sensor unit 200 for detecting a hemorheological parameter and arterial pressure at another region of the body, and a control unit 300, that is, a processor for calculating blood pressure.

More specifically, an embodiment of the present invention is a blood pressure measurement system for calculating a blood pressure value by using biometric signals measured at two different regions of the body, and includes the first sensor unit 100, the second sensor unit 200, and the control unit 300 described above.

In addition, the control unit 300 has a blood pressure calculation unit 310 that calculates a blood pressure BP value of the region where the first hemorheological parameter is detected, from a hemorheological parameter (first hemorheological parameter; $PM_1$) detected by the first sensor unit 100 and a hemorheological parameter (second hemorheological parameter; $PM_2$) and arterial pressure detected by the second sensor unit 200.

Hereinafter, a body region where the measurement is performed by the first sensor unit 100 is referred to as a first body region S1, and a region where the measurement is performed by the second sensor unit 200, that is, a body region where a signal for detecting vascular resistivity to be described below is measured is referred to as a second body region S2. The first body region S1 becomes a target region as a region where the calculation of the blood pressure value, that is, the acquisition of the blood pressure value is performed.

The blood pressure calculation unit 310 may calculate the vascular resistivity and the blood pressure value of the first body region. In more detail, the vascular resistivity R may be calculated by using a second hemorheological parameter variance $\Delta PM_2$ and an arterial pressure variance $\Delta P$ at two times acquired from the second hemorheological parameter $PM_2$ and the arterial pressure P detected at different two times by the second sensor unit 200, and the blood pressure value may be calculated by using the vascular resistivity R and the first hemorheological parameter $PM_1$ detected by the first sensor unit.

The hemorheological parameters (the first hemorheological parameter and the second hemorheological parameter) detected by the first sensor unit 100 and the second sensor unit 200 have blood flow information. More specifically, the hemorheological parameter may be one of a photoarterial wave, an arterial pressure wave, an arterial impedance wave, a blood flow rate, a pulse transit time (PTT), a pulse wave analysis (PWA), and a waveform parameter having the blood flow information. As a more specific example, in many types of waveforms described above, an amplitude of the waveform, an interval (time: t) between poles (valley and peak), and the like may become the hemorheological parameter described above.

In the embodiment, the blood pressure calculation unit 310 calculates the blood pressure value BP of the first body region described above by using the first hemorheological parameter $PM_1$ and the vascular resistivity R.

The blood pressure calculation unit 310 may also acquire a difference between a maximum blood pressure value (maximum arterial pressure) and a minimum blood pressure value (minimum arterial pressure) at the region where the arterial pressure is measured by the second sensor unit 200, that is, the second body region by the arterial pressure variance (arterial pressure difference). Of course, at two times with the time difference, the first sensor unit 100 measures the first hemorheological parameter and the second sensor unit 200 measures the second hemorheological parameter and the arterial pressure, and then between the two times, a variance of the first hemorheological parameter, a variance of the second hemorheological parameter (difference in second hemorheological parameter between two times), and an arterial pressure variance (difference in arterial pressure between two times) may also be obtained.

The first hemorheological parameter $PM_1$ and the second hemorheological parameter $PM_2$ may also be measured two times at the same time or measured two times at different times. For example, after the second hemorheological parameter and the arterial pressure are first measured together at the two times and then the first hemorheological parameter may also be measured.

The maximum blood pressure value $P_{Max}$ and the minimum blood pressure value $P_{Min}$ measured by the second sensor unit 200 may be acquired by any one of oscillometric blood pressure measurement, tonometric blood pressure measurement, and Korotkoff blood pressure measurement.

In the embodiment, the vascular resistivity R may be calculated by the following Equation 1; and the blood pressure value may be acquired by the following Equation 2.

$$R = \Delta P / \Delta PM_2 \qquad \text{[Equation 1]}$$

(R represents vascular resistivity, $\Delta P$ represents an arterial pressure variance, and $\Delta PM_2$ represents a second hemorheological parameter variance)

$$BP = PM_1 \times R \times K \qquad \text{[Equation 2]}$$

(BP represents a blood pressure value of region (first body region) where the first hemorheological parameter is detected, that is, measured by the first sensor unit, $PM_1$ represents a first hemorheological parameter value, R represents vascular resistivity, and K represents an adjustment constant)

Thus, the maximum blood pressure and the minimum blood pressure of the first body region S1 described above may be acquired in the same manner as illustrated in the following Equations 3 and 4.

$$BP_1 = (PM_1)\max \times R \times K \qquad \text{[Equation 3]}$$

($BP_1$ represents a maximum blood pressure value at the first body region, and
$(PM_1)$max represents a first hemorheological parameter maximum value)

$$BP_2 = (PM_1)\min \times R \times K \qquad \text{[Equation 4]}$$

($BP_2$ represents a minimum blood pressure value at the second body region, and $(PM_1)$min represents a first hemorheological parameter minimum value)

In addition, the control unit 300 may further include a setting unit 320 for setting the adjustment constant K.

The setting unit 320 may set the adjustment constant by using the first hemorheological parameter and the second hemorheological parameter detected while the first sensor unit 100 and the second sensor unit 200 are located at the same height. In other words, based on the state where the first sensor unit 100 and the second sensor unit 200 are located at the same height, the aforementioned adjustment constant may be set by biometric signals such as the first hemorheological parameter value, the second hemorheological parameter value, and the like acquired by the first sensor unit 100 and the second sensor unit 200, respectively.

For example, in the case of the blood pressure measurement by the oscillometric method, the first hemorheological parameter and the second hemorheological parameter are detected at the two times by the first sensor unit 100 and the second sensor unit 200, respectively, and the adjustment constant K may be set by a method illustrated in the following Equation 5 from a first hemorheological parameter variance and a second hemorheological parameter variance between the two times.

$$K = \Delta PM_2 / \Delta PM_1 \quad \text{[Equation 5]}$$

($\Delta PM_1$ represents a variance of the first hemorheological parameter, and $\Delta PM_2$ represents a variance of the second hemorheological parameter)

In addition, in the case of the blood pressure measurement by the tonometric method, the first hemorheological parameter, the second hemorheological parameter, and the arterial pressure are detected at two times by the first sensor unit 100 and the second sensor unit 200, respectively. The blood pressure of the first body region is measured at the two times by a reference sphygmomanometer for setting, that is, a separate sphygmomanometer (master sphygmomanometer) having the accuracy of the blood pressure measurement, respectively. The adjustment constant K may be set by the following Equation 6 from a first hemorheological parameter variance, a second hemorheological parameter variance, an arterial pressure variance, and a variance (reference blood pressure variance) of the blood pressure value measured by the reference sphygmomanometer between the two times.

$$K = \left(\frac{\Delta PM_2}{\Delta PM_1}\right) \times \left(\frac{\Delta M}{\Delta P}\right) \quad \text{[Equation 6]}$$

($\Delta PM_1$ represents a variance of the first hemorheological parameter, $\Delta PM_2$ represents a variance of the second hemorheological parameter, $\Delta P$ represents an arterial pressure variance, and $\Delta M$ represents a reference blood pressure variance)

In addition, the first sensor unit 100 and the second sensor unit 200 for detecting the hemorheological parameters may include at least one sensor selected from the group consisting of a pressure sensor, an optical sensor, an ultrasonic sensor, and a radar sensor.

More specifically, the first sensor unit 100 for detecting the first hemorheological parameter includes a blood flow measurement sensor 110 for detecting the first hemorheological parameter. In addition, the second sensor unit 200 for detecting the second hemorheological parameter and the arterial pressure may include a blood flow measurement sensor 210 for detecting the second hemorheological parameter and an arterial pressure measurement sensor 220 for measuring the arterial pressure.

Hereinafter, the blood flow measurement sensor 110 of the first sensor unit 100 is referred to as a first sensor, the blood flow measurement sensor 210 of the second sensor unit 200 is referred to as a second sensor, and the arterial pressure measurement sensor 220 of the second sensor unit 200 is referred to as a third sensor.

Since it is preferred that the first sensor of the first sensor unit 100 is worn on a region to detect the blood pressure and the blood pressure is measured at the heart height, the first sensor unit 100 may be worn on the same region as the heart height, for example, an upper arm region, but is not limited thereto, and may be worn on another region, for example, a wrist. When the first sensor unit 100 is worn on a region at a non-heart height such as a wrist or a finger, considering a height of the blood pressure measurement region, the blood pressure value of the corresponding region is corrected to a blood pressure value at the heart height or the blood pressure is measured while the first sensor unit 100 worn on the wrist is located at the heart height by lifting the wrist.

In addition, the second sensor unit 200 may be provided (worn) on a body region where arterial pressure is easily measured, for example, any one of body regions such as a finger, a wrist, a philtrum, and an earlobe. In FIG. 2, wearing regions of the first sensor unit 100 and the second sensor unit 200, i.e., the first body region S1 and the second body region S2 are illustrated. For example, the second sensor unit 200 includes an optical sensor (second sensor) for detecting the hemorheological parameter and a pressure sensor (third sensor) for measuring the arterial pressure, and detects the hemorheological parameter and the arterial pressure on a region where the arterial pressure is easily detected, for example, the wrist as described above.

The first sensor unit 100 and the second sensor unit 200 may be connected to the control unit 300 wiredly or wirelessly, and the biometric signals measured in the first sensor unit 100 and the second sensor unit 200, i.e., the first hemorheological parameter, the second hemorheological parameter, and the arterial pressure may be transmitted to the control unit 300 wiredly or wirelessly. For example, the first sensor unit 100 and the second sensor unit 200 may transmit the aforementioned biometric signals to the control unit 300 based on the Internet of Things (IoT).

The above-described blood pressure value may be output from the blood pressure output unit 400, for example, on a display device, and the display device may be provided on either a portion mounted with the first sensor unit 100 or a portion mounted with the second sensor unit 200 and may also be formed of an independent structure separately separated from the first sensor unit 100 and the second sensor unit 200, or the above-described control unit 300 may also be provided together on the display device.

The control unit 300 may be mounted on a component provided with the first sensor unit 100, for example, a band worn around the upper arm, and may be mounted on a component provided with the second sensor unit 200, for example, a band worn around the wrist, that is, a wrist strap. Of course, the control unit 300 may also be implemented on a communication terminal such as a smartphone and the like which communicates (e.g., short-range communication) with the first sensor unit 100 and the second sensor unit 200.

Referring to FIG. 3, a blood pressure measurement method, that is, a blood pressure calculation method according to an embodiment of the present invention is a blood pressure calculation method of calculating a blood pressure value by using biometric signals measured at two different regions and provides a blood pressure measurement method of calculating a blood pressure value of a region (first body region) where the first hemorheological parameter is detected, from a first hemorheological parameter $PM_1$ detected at one region (first body region) of a body and a second hemorheological parameter $PM_2$ and arterial pressure P detected at another region (second body region) of the body. More specifically, a control unit, that is, a processor for calculating the blood pressure may calculate a blood pressure value BP of the region where the first hemorheological parameter $PM_1$ is detected, that is, the first body region, from the first hemorheological parameter $PM_1$ and the second hemorheological parameter $PM_2$ and the arterial pressure P.

The blood pressure measurement method includes a step (a) (S110) of acquiring a second hemorheological parameter variance $\Delta PM_2$ and an arterial pressure variance $\Delta P$, a step (S120) of calculating vascular resistivity, and a step (S130) of calculating a blood pressure value, that is, the blood pressure value of the first body region.

More specifically, step (a) (S110) is a step of acquiring the second hemorheological parameter variance $\Delta PM_2$ and the arterial pressure variance $\Delta P$ between the two times from the second hemorheological parameter $PM_2$ and the arterial pressure P acquired at the two different times.

In addition, step (b) (S120) is a step of calculating vascular resistivity R from the second hemorheological parameter variance $\Delta PM_2$ and the arterial pressure variance $\Delta P$, and step (c) (S130) is a step of calculating the blood pressure value BP by using the vascular resistivity R and the first hemorheological parameter $PM_1$.

Step (a) may also acquire a difference between a maximum blood pressure value $P_{Max}$ and a minimum blood pressure value $P_{Min}$ of the region where the arterial pressure P is measured, that is, the second body region S2 as the arterial pressure variance $\Delta P$. That is, the arterial pressure variance, that is, the arterial pressure difference may also be expressed as follows.

Arterial pressure variance $\Delta P$=maximum blood pressure value $P_{Max}$-minimum blood pressure value $P_{Min}$ In order to calculate the arterial pressure variance, by any one method of oscillometric blood pressure measurement, tonometric blood pressure measurement, and Korotkoff blood pressure measurement, the arterial pressure of the second body region, more specifically, the maximum blood pressure value and the minimum blood pressure value may be measured.

In the embodiment, step (b) (S120) includes a step of calculating the vascular resistivity R by using the above-described Equation 1. In addition, step (c) (S130) includes acquiring the blood pressure value BP by using the above-described Equation 2.

In addition, the blood pressure measurement method further include, before step (a) (S110), a biometric signal measurement step (S100) of measuring the first hemorheological parameter $PM_1$ having blood flow information on one region (first body region) of the body, and measuring the second hemorheological parameter $PM_2$ having blood flow information on another region (second body region) of the body, and further the arterial pressure P of the second body region.

For example, in the biometric signal measurement step (S100), after the process of measuring the second hemorheological parameter $PM_2$ and the arterial pressure P of the second body region for calculating the vascular resistivity is first performed, the process of measuring the first hemorheological parameter $PM_1$ of the first body region may be performed.

The blood pressure measurement method according to the embodiment may further include a setting step (S140) of setting the adjustment constant K, before step (c) (S130). The setting method of the adjustment constant K may be performed by the setting unit 320 of the blood pressure measurement system according to the present invention as described above. The setting step (S140) may be performed only once for first setting of the blood pressure measurement system described above or selectively performed only during a time required after the biometric signal measurement step (S10). For example, when the accuracy of the blood pressure value calculated by the blood pressure measurement method is deteriorated, the aforementioned setting step (S140) may also be performed limitedly for error correction. The setting step (S140) may be selectively performed between step (a) and step (c), for example, before and after step (b) (S120).

Then, the blood pressure value calculated by the method is output to a blood pressure output unit, for example, a display device so as to be seen by a user (S200).

Hereinafter, specific examples of the blood pressure measurement method by the blood pressure measurement system according to the present invention will be described with reference to FIGS. 4 to 9.

Figure 4:
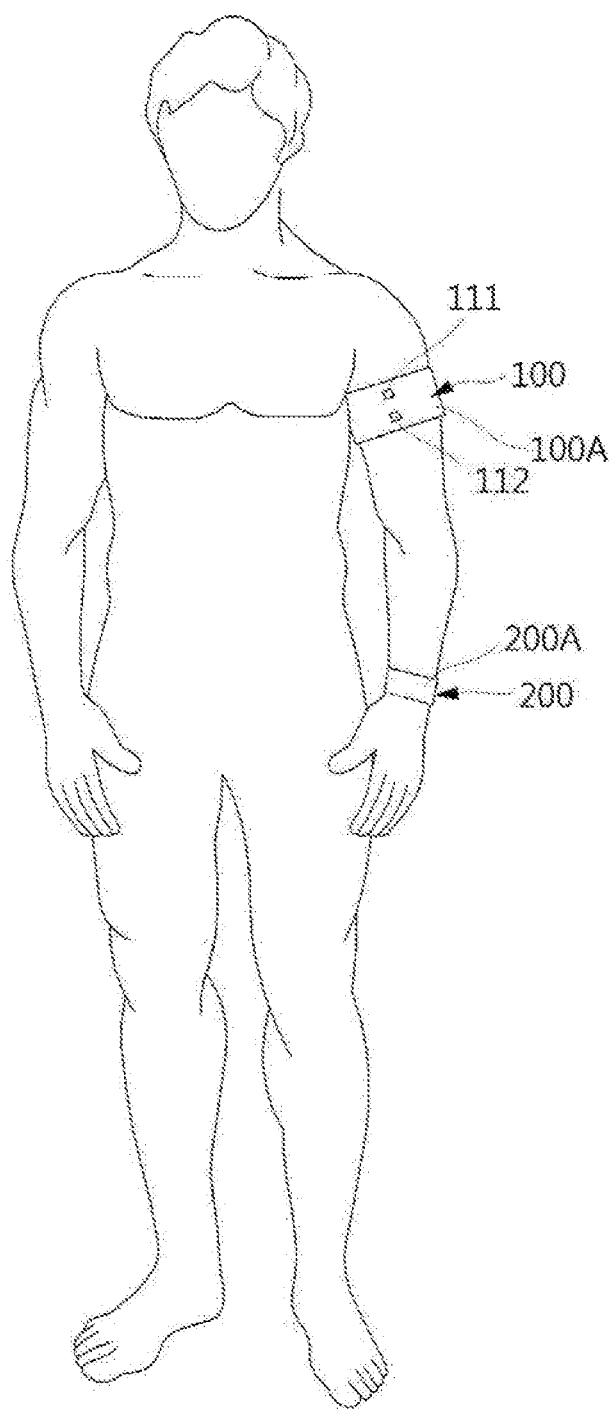
FIG. 4 is a diagram illustrating an example of the blood pressure measurement method by the blood pressure measurement system according to an embodiment of the present invention.
Figure 5:
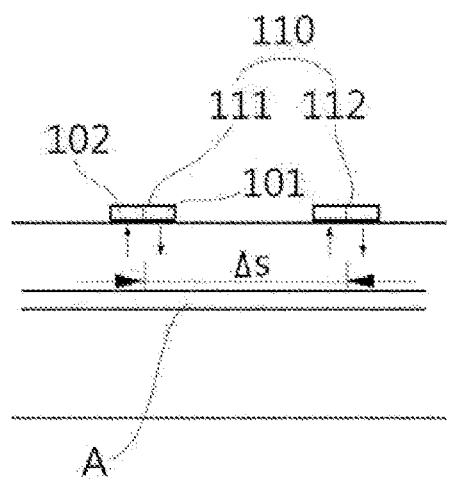
FIG. 5 is a diagram illustrating an example of hemorheological parameter detection by a first sensor unit of the blood pressure measurement system illustrated in FIG. 4.
Figure 5:
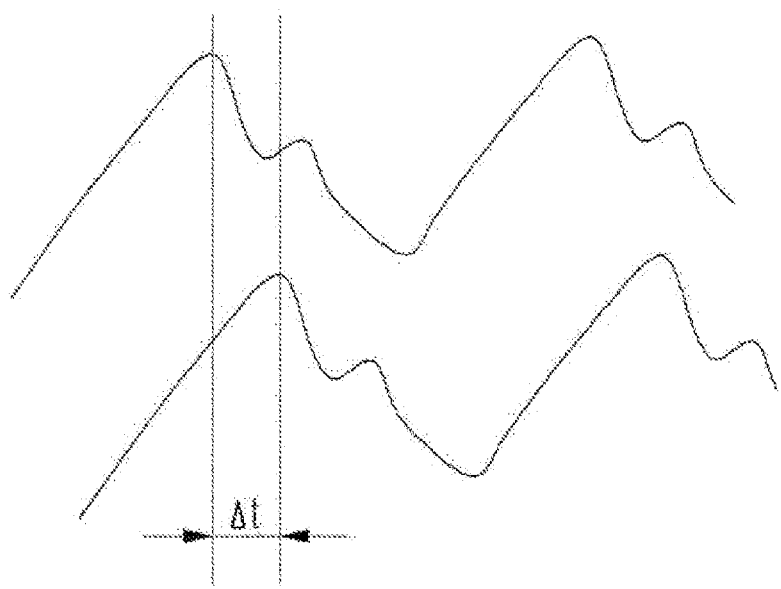
Figure 6:
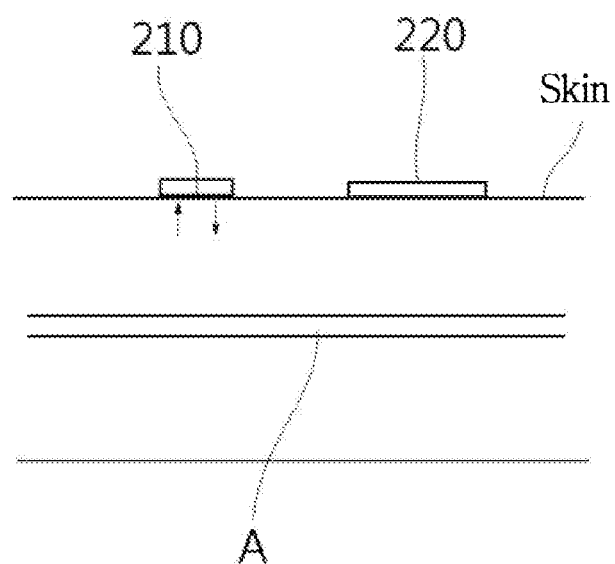
FIG. 6 is a diagram illustrating an example of a second sensor unit of the blood pressure measurement system illustrated in FIG. 4.

First, referring to FIGS. 4 to 6, in a specific embodiment of the blood pressure measurement system according to the present invention, two optical sensors 111 and 112 including a light emitting device 101 and a light receiving device 102 are applied as the aforementioned first sensor 110, that is, the blood flow measurement sensor, that is, the first sensor 110 of the first sensor unit 100. In addition, one optical sensor separately including a light emitting device and a light receiving device is applied as the second sensor 210, that is, the blood flow measurement sensor of the second sensor unit 200, and a film type pressure sensor is applied as the third sensor 220, that is, the arterial pressure measurement sensor of the second sensor unit 200.

As described above, the first sensor 110 includes the two optical sensors 111 and 112, and when a pulse wave is detected as shown in FIG. 5B at two points on a blood vessel A with an interval $\Delta s$ (a blood vessel length between two points for blood flow measurement) between the blood flow measurement points, a difference $\Delta t$ in pulse wave transfer time occurs. As a result, a blood flow rate ($V=\Delta s/\Delta t$) may be acquired, and the blood flow rate may be applied as the first hemorheological parameter $PM_1$.

In addition, according to the second sensor unit 200 illustrated in FIG. 6, the optical sensor, that is, the second sensor 210 of the second sensor unit measures a second hemorheological parameter, for example, a photoarterial wave, and the film type pressure sensor, that is, the third sensor 220 of the second sensor unit measures the arterial pressure P to calculate the aforementioned arterial pressure variance. Of course, the second sensor unit 200 is also provided with two optical sensors like the first sensor unit 100 described above to detect a blood flow rate as the second hemorheological parameter described above.

The first sensor unit 100 may be provided on a band 100A worn around the upper arm, and the second sensor unit 200 may be provided on a band worn around the wrist, that is, a wrist strap 200A.

Figure 7:
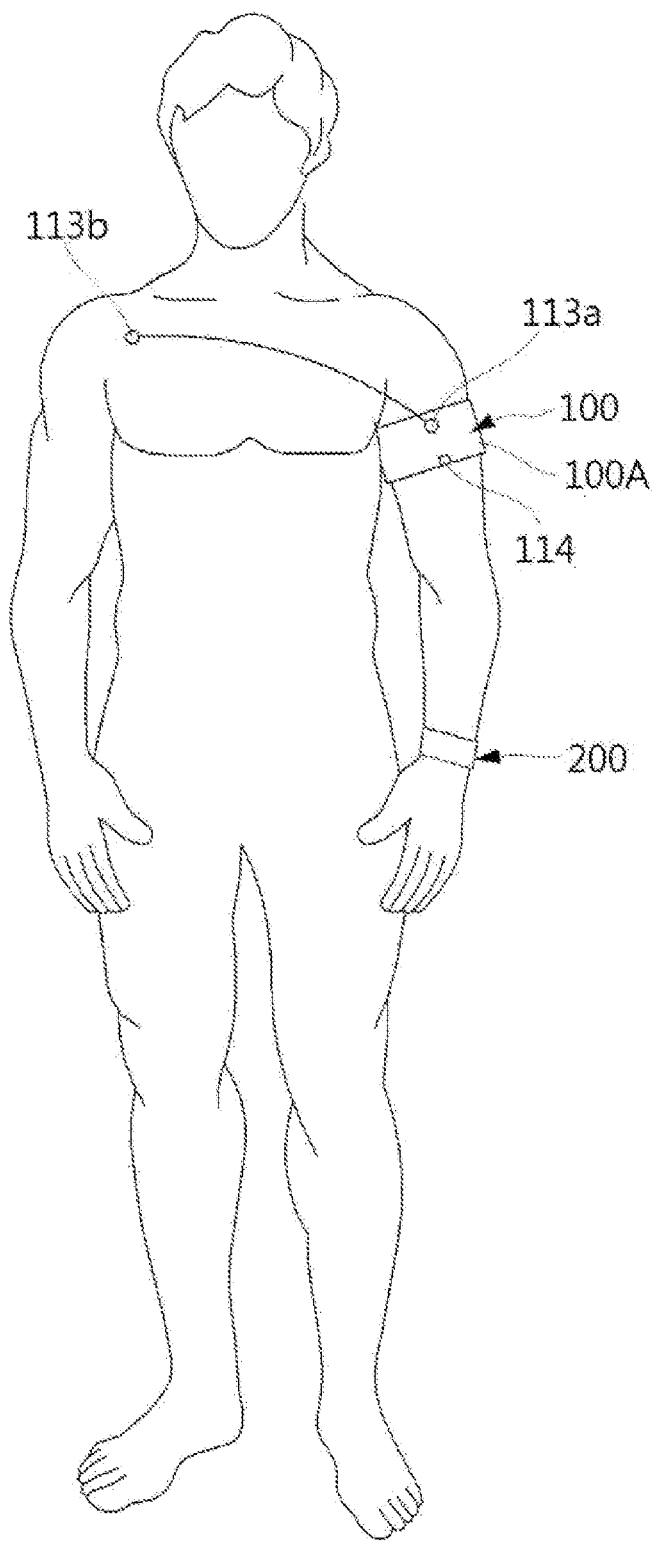
FIG. 7 is a diagram illustrating an example of a blood pressure measurement method by a blood pressure measurement system according to another embodiment of the present invention.
Figure 8:
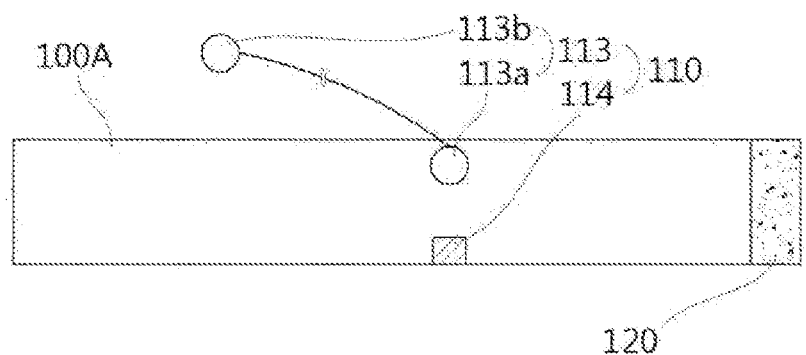
FIG. 8 is a diagram illustrating a first sensor unit and an example of hemorheological parameter detection by the first sensor unit in the blood pressure measurement system illustrated in FIG. 7.
Figure 8:
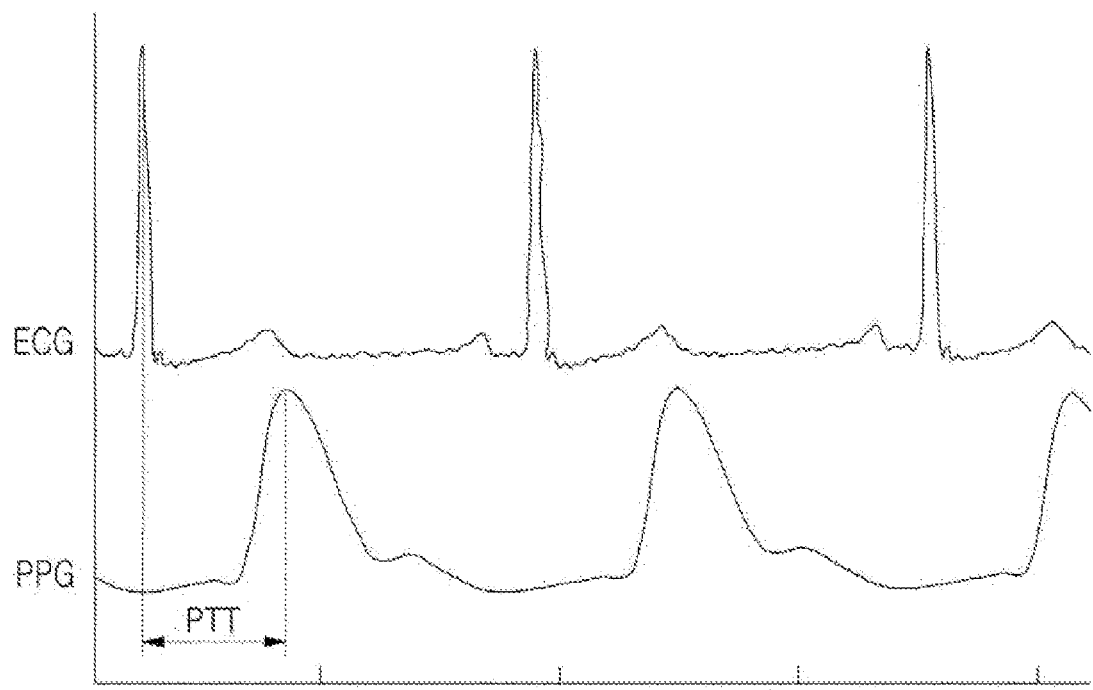
Figure 9:
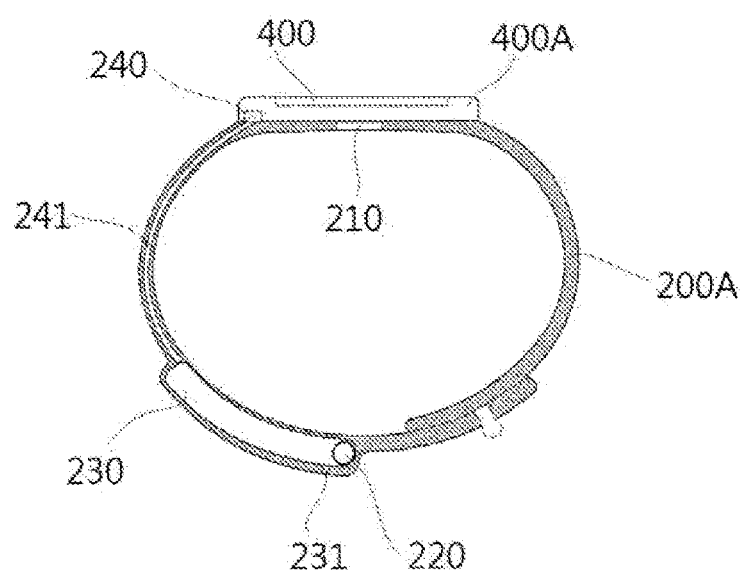
FIG. 9 is a diagram illustrating a second sensor unit and an example of arterial wave detection by the second sensor unit in the blood pressure measurement system illustrated in FIG. 7.

Next, referring to FIGS. 7 to 9, another specific embodiment of the blood pressure measurement system according to the present invention is an example in which the first sensor unit 100 detects a pulse transit time (PTT) and the second sensor unit 200 detects an arterial pressure wave, for example, an arterial pressure wave (variable pressure arterial wave) under variable pressure.

In more detail, the example of the first sensor unit 100 for the embodiment is a configuration for detecting an electrocardiogram (ECG) and pulse waves, and includes the first sensor 110 for detecting PTT as the first hemorheological parameter described above.

In the embodiment, the first sensor 110 may include an ECG measurement unit (ECG meter) 113 for measuring the electrocardiogram (ECG) and a pulse wave measurement unit 114 for measuring the pulse waves at the first body region. The ECG measurement unit 113 has two electrodes 113a and 113b. In addition, the pulse wave measurement unit 114 may be applied with an optical sensor including a light emitting device and a light receiving device, for example, a photoplethysmography (PPG).

Therefore, the ECG may be detected by the ECG measurement unit 113, and the pulse wave, that is, the photoarterial wave may be detected by the pulse wave measurement unit 114, and the PTT described above is applied as the first hemorheological parameter.

The first sensor unit 100, that is, the ECG measurement unit 113 and the pulse wave measurement unit 114 may be provided together on a predetermined region of the body, for example, the band 100A wearable on the arm (upper arm), as illustrated in FIG. 8. Both ends of the band 100A may also be detachably connected by other detachment means such as a Velcro 120.

In addition, in the embodiment, there is disclosed an example in which one optical sensor including a light emitting device and a light receiving device is applied as the blood flow measurement sensor, that is, the second sensor 210 of the second sensor unit 200, and a pneumatic sensor is applied as the arterial pressure measurement sensor, that is, the third sensor 220 of the second sensor unit 200.

The second sensor 210 and the third sensor 220, that is, the optical sensor and the pneumatic sensor of the second sensor unit 200 may be provided on the wrist strap 200A worn around the wrist like an example illustrated in FIG. 9. In addition, in the wrist strap 200A, an air bag 230 for pressing the wrist and an air pump 240 for air supply of the air bag 230 are provided. In the air bag 230, the pneumatic sensor, that is, the third sensor 220 is provided, and in the air bag 230, an air discharge valve 231 for air discharging is connected.

In the wrist strap 200A, a case 400A of the screen output unit 400 may be mounted, and the aforementioned air pump 240 may be embedded in the case 400A.

According to the embodiment, while the air bag 230 is slowly air-supplied by the air pump 240 and then air-discharged, the measurement of the arterial wave, that is, the measurement of the variable pressure arterial wave by the pneumatic sensor 220 is performed. Accordingly, the arterial pressure may be detected by the pneumatic sensor 220, and the second hemorheological parameter may be detected by the optical sensor 210, for example, a photoplethysmography.

Figure 10:
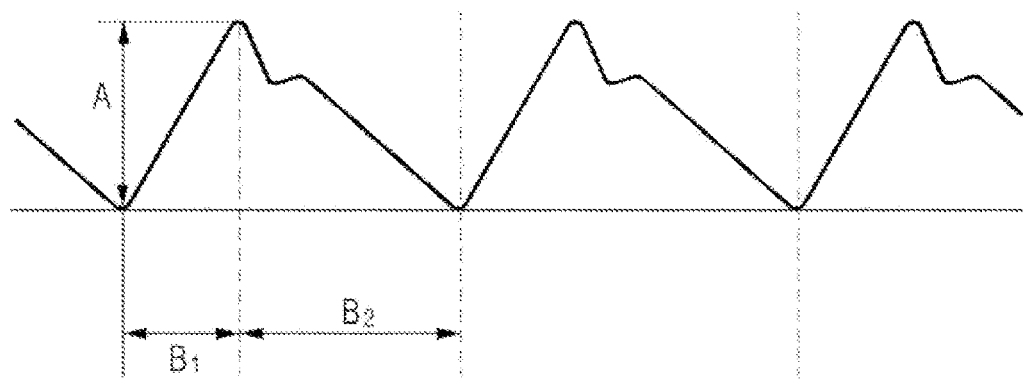
FIG. 10 is a graph showing a pulse wave parameter as another example of the hemorheological parameter.

FIG. 10 is a pulse wave parameter as an example of a graph hemorheological parameter illustrating another form of the pulse wave capable of being measured in the sphygmomanometer. Referring to FIG. 10, an amplitude A (height difference between a maximum point and a minimum point) of the pulse wave, time intervals $B_1$ and $B_2$ between adjacent pole points, for example, a cycle of waveforms, and the like may be applied as an example of the hemorheological parameter. The pole point mean a valley and a peak, for example, points where a first-order differential value is 0 (zero), and a time interval between the adjacent pole points means a time interval between adjacent valley-peak or peak-valley.

Figure 11:
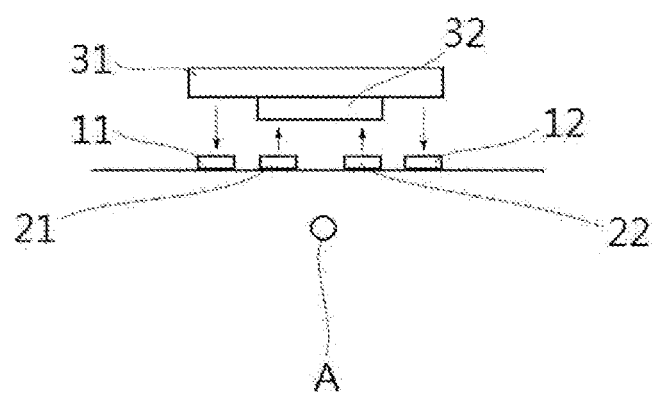
FIG. 11 is a diagram illustrating a detection structure of arterial impedance waves as yet another example of the hemorheological parameter.

In addition, FIG. 11 is a diagram illustrating a detection structure of an arterial impedance wave as yet another example of the hemorheological parameter. While alternating current is applied to both ends 11 and 12, two inner electrodes 21 and 22 measure a voltage change and detect a body impedance wave, that is, an arterial impedance wave.

More specifically, the current generated from an AC generation device 31 is applied to the body (skin) through the electrodes 11 and 12, and signals measured in the two different electrodes 21 and 22 are converted to the voltage in a voltage conversion device 32 to calculate resistance of the body between the electrodes as a measuring voltage/generating current. At this time, an artery A may be positioned between the two inner electrodes 21 and 22 to detect the variance of the artery.

In the specific embodiment of the present invention described above, the vascular resistivity is simply measured from a wrist radial artery by the band worn on the wrist and provided with the second sensor unit 200, and the blood pressure value at the heart height may be obtained by measuring the hemorheological parameter such as a blood flow rate and the like by the band worn on the heart height region of the arm, that is, the upper arm and provided with the first sensor unit 100.

The prepared embodiment of the present invention has been described as above and a fact that the present invention can be materialized in other specific forms without departing from the gist or scope in addition to the above described embodiments will be apparent to those skilled in the art.

Therefore, the aforementioned embodiments are not limited but should be considered to be illustrative, and accordingly, the present invention is not limited to the above description and may be modified within the scope of the appended claims and a range equivalent thereto.

INDUSTRIAL APPLICABILITY

The present invention is a blood pressure measurement device for measuring the blood pressure of the body, and is the invention available in a medical device field, particularly a sphygmomanometer related technical field, and according to the present invention, it is possible to calculate a blood pressure value rapidly and accurately based on a hemorheological parameter variance and vascular resistivity.

The invention claimed is:

1. A blood pressure measurement system for calculating a blood pressure value by using biometric signals measured at two different regions, comprising:
    a first sensor unit configured to detect a first hemorheological parameter at a first region of a body;
    a second sensor unit configured to detect a second hemorheological parameter and an arterial pressure at a second region of the body;
    a control unit including a blood pressure calculation unit for calculating a blood pressure value from the first hemorheological parameter detected by the first sensor unit and the second hemorheological parameter and the arterial pressure detected by the second sensor unit; and
    a display device configured to display the blood pressure value, wherein the first region is an upper arm region and the second region is one of a finger, a wrist, a philtrum, and an earlobe, wherein the blood pressure calculation unit acquires a second hemorheological parameter variance and an arterial pressure variance from the second hemorheological parameter and the arterial pressure, respectively, to calculate a vascular resistivity and calculates the blood pressure value by using the vascular resistivity and the first hemorheological parameter, wherein the vascular resistivity is calculated by the following Equation 1 and the blood pressure value is acquired by the following Equation 2:

$$R = \Delta P/\Delta PM_2 \qquad \text{[Equation 1]}$$

(R represents the vascular resistivity, ΔP represents the arterial pressure variance, and ΔPM₂ represents the second hemorheological parameter variance)

$$BP = PM_1 \times R \times K \qquad \text{[Equation 2]}$$

(BP represents the blood pressure value, PM₁ represents the first hemorheological parameter, R represents the vascular resistivity, and K represents an adjustment constant).

2. The blood pressure measurement system of claim 1, wherein the blood pressure calculation unit acquires a difference between a maximum blood pressure value and a minimum blood pressure value at the second region as the arterial pressure variance.

3. The blood pressure measurement system of claim 2, wherein the maximum blood pressure value and the minimum blood pressure value measured by the second sensor unit are acquired by any one of oscillometric blood pressure measurement, tonometric blood pressure measurement, and Korotkoff blood pressure measurement.

4. The blood pressure measurement system of claim 1, wherein the control unit further includes a setting unit for setting the adjustment constant.

5. The blood pressure measurement system of claim 4, wherein the setting unit sets the adjustment constant by using the first hemorheological parameter and the second hemorheological parameter detected while the first sensor unit and the second sensor unit are located at a same height.

6. The blood pressure measurement system of claim 1, wherein the first hemorheological parameter and the second hemorheological parameter have blood flow information.

7. The blood pressure measurement system of claim 6, wherein each of the first hemorheological parameter and the second hemorheological parameter is one of a photoarterial wave, an arterial pressure wave, an arterial impedance wave, a blood flow rate, a pulse transit time (PTT), a pulse wave analysis (PWA), and a waveform parameter having the blood flow information.

8. The blood pressure measurement system of claim 1, wherein the first sensor unit and the second sensor unit include at least one sensor selected from the group consisting of a pressure sensor, an optical sensor, a ultrasonic sensor, and a radar sensor.

9. The blood pressure measurement system of claim 1, wherein the second sensor unit includes a blood flow measurement sensor for detecting the second hemorheological parameter and an arterial pressure measurement sensor for detecting the arterial pressure.

10. The blood pressure measurement system of claim 1, wherein the first sensor unit and the second sensor unit are connected to the control unit wiredly or wirelessly.

11. A blood pressure measurement method for calculating a blood pressure value by using biometric signals measured at two different regions, comprising:

detecting a first hemorheological parameter at a first region of a body;

detecting a second hemorheological parameter and an arterial pressure at a second region of the body;

calculating a blood pressure value from the first hemorheological parameter detected at the first region and the second hemorheological parameter and the arterial pressure detected at the second region; and displaying the blood pressure value on a display device, wherein the first region is an upper arm region and the second region is one of a finger, a wrist, a philtrum, and an earlobe, wherein the calculating the blood pressure value comprises:

a step (a) of acquiring a second hemorheological parameter variance and an arterial pressure variance from the second hemorheological parameter and the arterial pressure, respectively;

a step (b) of calculating a vascular resistivity from the second hemorheological parameter variance and the arterial pressure variance; and a step (c) of calculating the blood pressure value by using the vascular resistivity and the first hemorheological parameter, wherein step (b) includes calculating the vascular resistivity by using the following Equation 1 and step (c) includes acquiring the blood pressure value by using the following Equation 2:

$$R = \Delta P/\Delta PM_2 \qquad \text{[Equation 1]}$$

(R represents the vascular resistivity, ΔP represents the arterial pressure variance, and ΔPM₂ represents the second hemorheological parameter variance)

$$BP = PM_1 \times R \times K \qquad \text{[Equation 2]}$$

(BP represents the blood pressure value, PM₁ represents the first hemorheological parameter, R represents the vascular resistivity, and K represents an adjustment constant).

12. The blood pressure measurement method of claim 11, wherein in step (a), a difference between a maximum blood pressure value and a minimum blood pressure value at the second region is acquired as the arterial pressure variance.

13. The blood pressure measurement method of claim 12, wherein the maximum blood pressure value and the minimum blood pressure value are acquired by any one of oscillometric blood pressure measurement, tonometric blood pressure measurement, and Korotkoff blood pressure measurement.

14. The blood pressure measurement method of claim 11, further comprising:

a setting step of setting the adjustment constant, before step (c).

15. The blood pressure measurement method of claim 11, further comprising:
   a step of measuring the first hemorheological parameter having blood flow information on the first region and measuring the second hemorheological parameter having blood flow information on the second region, before step (a).

\* \* \* \* \*